(12) United States Patent
Globuschutz

(10) Patent No.: US 6,301,568 B2
(45) Date of Patent: *Oct. 9, 2001

(54) INTEGRATED SUBSCRIBER MANAGEMENT SYSTEM ARCHITECTURE SUPPORTING MULTIPLE SERVICES

(75) Inventor: Mark J. Globuschutz, Louisville, CO (US)

(73) Assignees: Mediaone Group, Inc., Englewood; U S West, Inc., Denver, both of CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,040
(22) Filed: Apr. 28, 1997
(51) Int. Cl.[7] ........................................ G06F 17/60
(52) U.S. Cl. ................................................ 705/34
(58) Field of Search ............................... 705/9, 14, 30, 705/34, 39; 707/10, 101, 204

(56) References Cited

U.S. PATENT DOCUMENTS

| | | | | |
|---|---|---|---|---|
| 4,645,873 | * | 2/1987 | Chomet | 379/93.12 |
| 5,077,694 | * | 12/1991 | Sansone et al. | 707/104 |
| 5,247,661 | * | 9/1993 | Hager et al. | 707/104 |
| 5,465,206 | * | 11/1995 | Hilt et al. | 705/40 |
| 5,623,660 | * | 4/1997 | Josephson | 707/9 |
| 5,696,906 | * | 12/1997 | Peters et al. | 705/34 |
| 5,852,812 | * | 12/1998 | Reeder | 705/39 |
| 5,995,946 | * | 11/1999 | Auzenne et al. | 705/34 |

OTHER PUBLICATIONS

Product brochure entitled "Cable Data, CableData's Intelecable System", by CableData International, Ltd., Hampshire, England, Copyright 1994, 1995.*

Kim, Young–Kuk, Lehr, Matthew R., Son, Sang H., "Software architecture for a firm real–time database system", Journal of Systems Architecture, pp. 547–562, 1996.*

* cited by examiner

Primary Examiner—Michael J. Milano
(74) Attorney, Agent, or Firm—Brooks & Kushman P.C.

(57) ABSTRACT

An integrated service management architecture supporting configuration and accounting management functions for multiple services includes a database for storing configuration and accounting data. At least one service application independent from the database has the ability to use, act upon, change, and update the data stored in the database for facilitating service delivery and control of service provided by at least one service application. A predefined application program interface is utilized having a set of communication rules and protocols permitting two-way exchange of information between the database and at least one service application.

8 Claims, 3 Drawing Sheets

INTEGRATED SUBSCRIBER MANAGEMENT SYSTEM ARCHITECTURE SUPPORTING MULTIPLE SERVICES

TECHNICAL FIELD

This invention relates to an integrated service management platform supporting configuration and accounting management functions necessary to support multiple services, such as cable television and telephony, offered by a variety of vendors.

BACKGROUND ART

The integration of telephony, video, and other services on a common broadband network has motivated the desire for integration of the configuration management and accounting management functions onto a single Subscriber Management System (SMS). Configuration management consists of those functions associated with maintenance and management of customer data and associated data that is necessary to provision and maintain customer service. The customer data consists of customer address information, billing information, customer selected services, available services, residence addresses capable of being served by the network, residence and customer service history, set top box or interdiction unit inventory management, technician work force management, and selected network information required to support service provisioning. The configuration management functions also support and record the activities performed by the customer service representatives during their customer interface processes.

The SMAS is required to be operational at the time of initial customer service provisioning and is the primary repository for the operational data. Identification of the necessary SMS functions result from analysis of the proposed business processes, activities assigned to the various business areas, and the service platforms supporting the marketed services.

Accounting management consists of those functions that relate the customer to the services for the purpose of billing. Based on the various services selected by the customers, the accounting management functions generate and maintain the billing data that include tax information for specific geographical areas, tariffs, premium features, pay per view, and other customer selected services that are required to be integrated into the periodic billing cycle. Reconciliation of the customer account is then supported at the end of each billing cycle. Tracking and accounting functions relating to payment to service providers (i.e., premium channel providers) are also addressed in this functional area.

FIG. 1 is a block diagram of a typical support systems architecture for cable television (CATV) services. The customer service representatives (CSRs) 10 are directly supported by the SMS 12. The Service Control Manager 14 has an interface to the SMS 12 to facilitate automatic control of customer service control decoder devices, such as set top boxes 15a, interdiction units 15b and controllable taps 15c. In this diagram, a separate Work Force Management (WFM) & Integrator system 16 is shown. Many SMSs have work force dispatch capabilities included within their functionality, but they do not support the functions necessary to integrate the Network Status Monitoring functionality 18. The output of the WFM & Integrator 16 supports the provisioning and maintenance activities of the field and head end technicians 20 and 22, respectively.

The SMS 12 and the WFM & Integrator 16 perform the network layer functions for the subtending systems. The SMS 12 also provides service layer functions necessary to enable the CSRs 10 to effectively interface with the end user customers. The remaining systems are element management layer systems or network elements, and they perform functions that are critical to the delivery of video services and management of the network delivery platform.

With the introduction of integrated CATV and telephony services, it is desirable to integrate the SMS functionality to support all services. All services are then supported with a single system containing an expanded data base. FIG. 2 is a block diagram representation of a prior art integrated SMS architecture. Shown on the left side of the SMS platform is the CATV service platform. This represents the functionality contained in FIG. 1 in an abbreviated manner. The right side of the diagram represents the telephony service platform and contains the primary components necessary to support telephony services. Depending on the SMS vendor, functionality such as the Circuit Inventory and Assignments 24 might be included in the SMS 12 or processed by an external system. The Work Force Management functionality 16 is shown closely coupled to the SMS functionality 12. This may be handled by a separate platform interfacing with the SMS 12 or as an integral function of the SMS 12. The Work Activity Delivery function 28 can be provided by paper, with cellular telephone or radio channels to a mobile data terminal located with a technician.

The overall functionality of the SMS in the integrated environment is much more complex than it was for CATV alone. It is also difficult for vendors to achieve a balance in functionality between CATV and telephony capabilities. One known vendor having excellent knowledge of the CATV business, with little knowledge of telephony operations, provides an integrated SMS architecture having good CATV support. This system, however, requires additional revisions to achieve acceptable telephony support. On the other hand, a second known vendor having excellent knowledge of the telephony business provides a system stronger in its telephony support than CATV. Both systems have weaknesses in providing integrated service support for cross marketing of services and are not flexible in bill processing or the addition of new services.

Changes and updates to both systems are difficult to accomplish and require an excessive amount of time to accomplish. Because of the complexity of the systems, each enhancement or modification requires extensive testing to determine if the system is adversely affected by the change. The clients of these systems are required to establish their own testing capabilities to exercise the software and achieve a level of confidence in the enhancement and the overall system functionality before they could introduce it into their operations. This adds to the delay of an introduction of needed capabilities into operation. Because each system is a single vendor product, the clients also have only one vendor to deal with for enhancements and are forced to pay what that vendor charges, accept the time intervals for the changes, or do without the desired functionality.

Thus, there exists a need for an integrated service management platform designed to support the configuration and management functions necessary to support multiple services, either available now or will be available in the future. Such an architecture would enable vendors to provide stand alone applications providing flexibility of service support to the user to meet changing service opportunities quickly and with minimal expense.

DISCLOSURE OF THE INVENTION

It is thus a general object of the present invention to provide an integrated subscriber management system architecture supporting multiple services.

In carrying out the above object and other objects, features, and advantages of the present invention, an integrated service management architecture supporting configuration and accounting management functions for multiple services is provided. The architecture comprises a database for storing configuration and accounting data. The architecture also includes at least one service application independent from the database having the ability to manipulate the data stored in the database for facilitating delivery and control of service provided by at least one service application. The architecture further includes a predefined application program interface having a set of communication rules and protocols permitting two-way exchange of information between the database and the at least one service application.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 3:
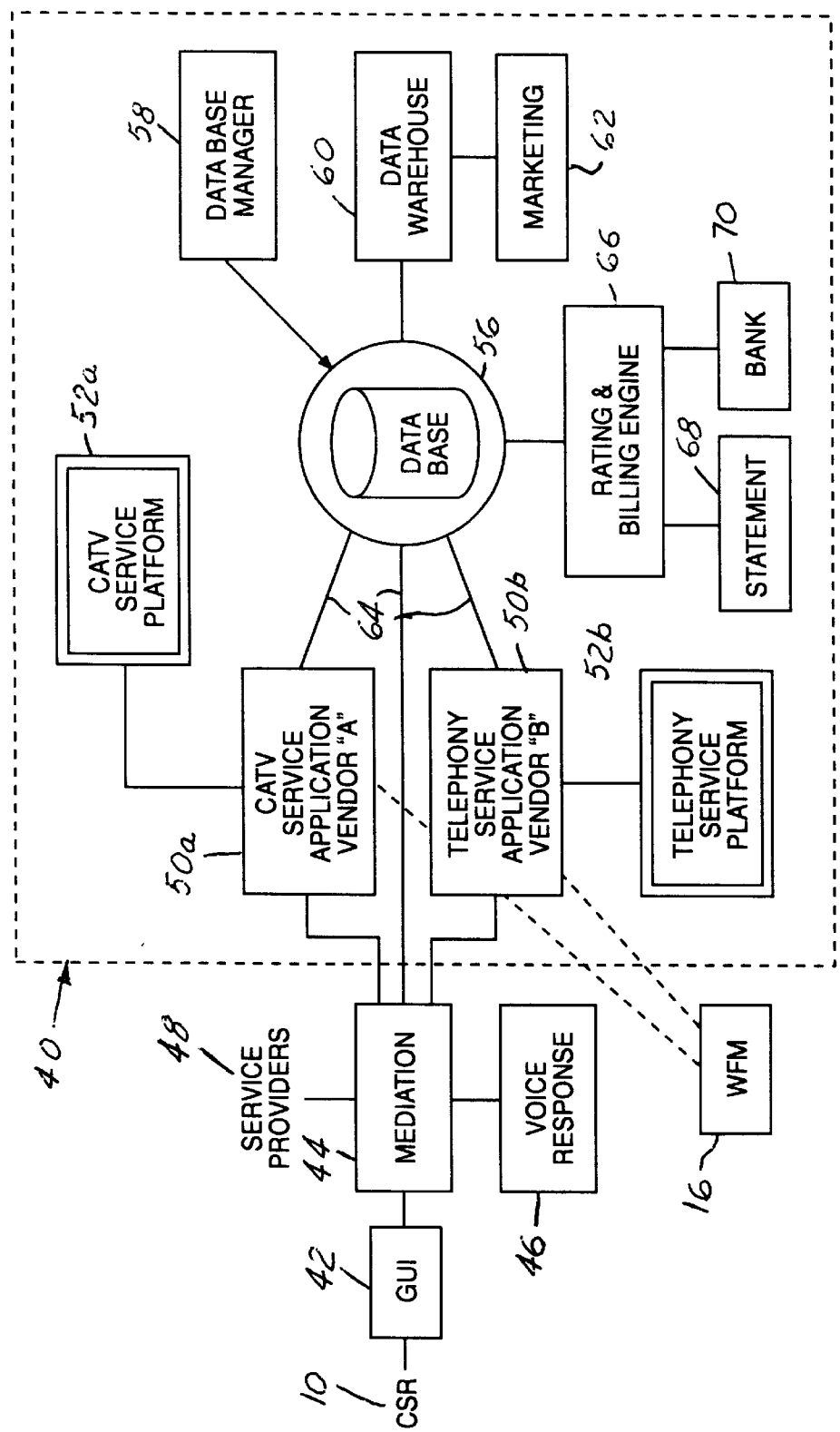
FIG. 3 is a block diagram of the integrated subscriber management system architecture of the present invention.

Turning now to FIG. 3, there is shown a block diagram illustration of the system architecture of the present invention, denoted generally by reference numeral 40. The system 40 shown in FIG. 3 supports two services, CATV and telephony, however, the system 40 is not restricted to only those services. In fact, the system 40 is designed to support multiple services and manage additional service platforms.

The system 40 is a functional decomposition of a generic SMS, and includes a Graphical User Interface (GUI) 42. GUI 42 is a software presentation of an independent application that provides the CSR 10 with a consistent user interface. GUI 42 is customized to meet the customer's needs in order to provide the flexibility required to incorporate data fields as needed, and to accommodate existing services and newly introduced services. GUI 42 also accommodates unique requirements that may exist for a variety of ventures in diverse environments and cultures. GUI 42 enables the CSR 10 to interface with the functionality of the system 40 and enables a large degree of flexibility in the data input and presentation associated with the various services.

The system 40 of the present invention preferably includes a Mediation layer 44 between GUI 42 and the service support applications, described in greater detail below. Mediation layer 44 is a table-driven software application that provides a security layer between GUI 42 and the application platforms that constitute the major parts of the system architecture. Mediation layer 44 provides the secure access to the system 40 utilizing a mapping between passwords and/or identification numbers and features/permissions. Mediation layer 44 also provides the interface that is required between additional user interfaces, such as a voice response unit 46 or outside service providers 48, and facilitates a consistent interface to the interfacing entities providing the flexibility to change downstream system applications without a change being apparent to the users.

Outside service providers 48 are service providers that provide or manage services and desire to control their distribution and availability to the end user customers without requiring the involvement of a CSR 10. For example, the outside service provider 48 could be a single channel service provider or Vertical Blanking Interval (VBI) service provider that interfaces directly with the end user customer and may even provide special equipment required to support their service. The outside service provider 48 can then use the network for transport of their service and rent bandwidth on a wholesale basis. A customer service representative of the outside service provider 48 provides the customer interface, and the network information is all that is required to be maintained by the venture business.

Mediation layer 44 provides the security fire wall between the service provider and the venture systems and data, and provides the necessary data management for the provider to manage their service. Data is received from the service provider and can also be presented to the provider to support service status and notification of network conditions affecting service. Interaction between the service provider and the network management functionality can be billable as desired by the venture. An interface between the provider and Mediation layer 44 can be as basic as VT100, Asynchronous, or ASCII over dial up lines or an interface supporting a mechanized input via a private line, depending on the desires of the service provider. Additional capabilities such as parity of service measurements can be supported by Mediation layer 44 if required by the venture or regulating governmental bodies.

Figure 1:
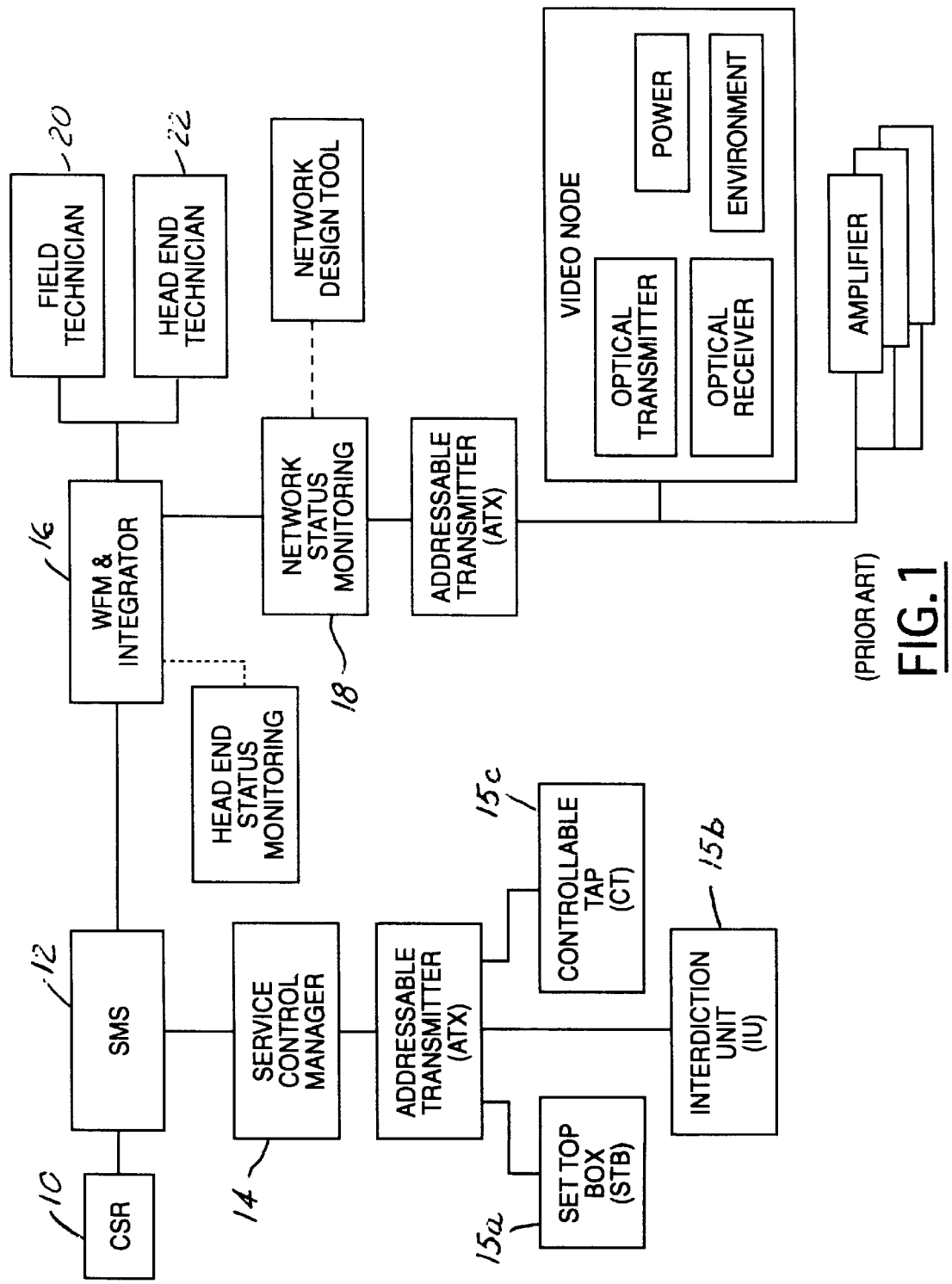
FIG. 1 is a block diagram of a support system architecture for cable television services.
Figure 2:
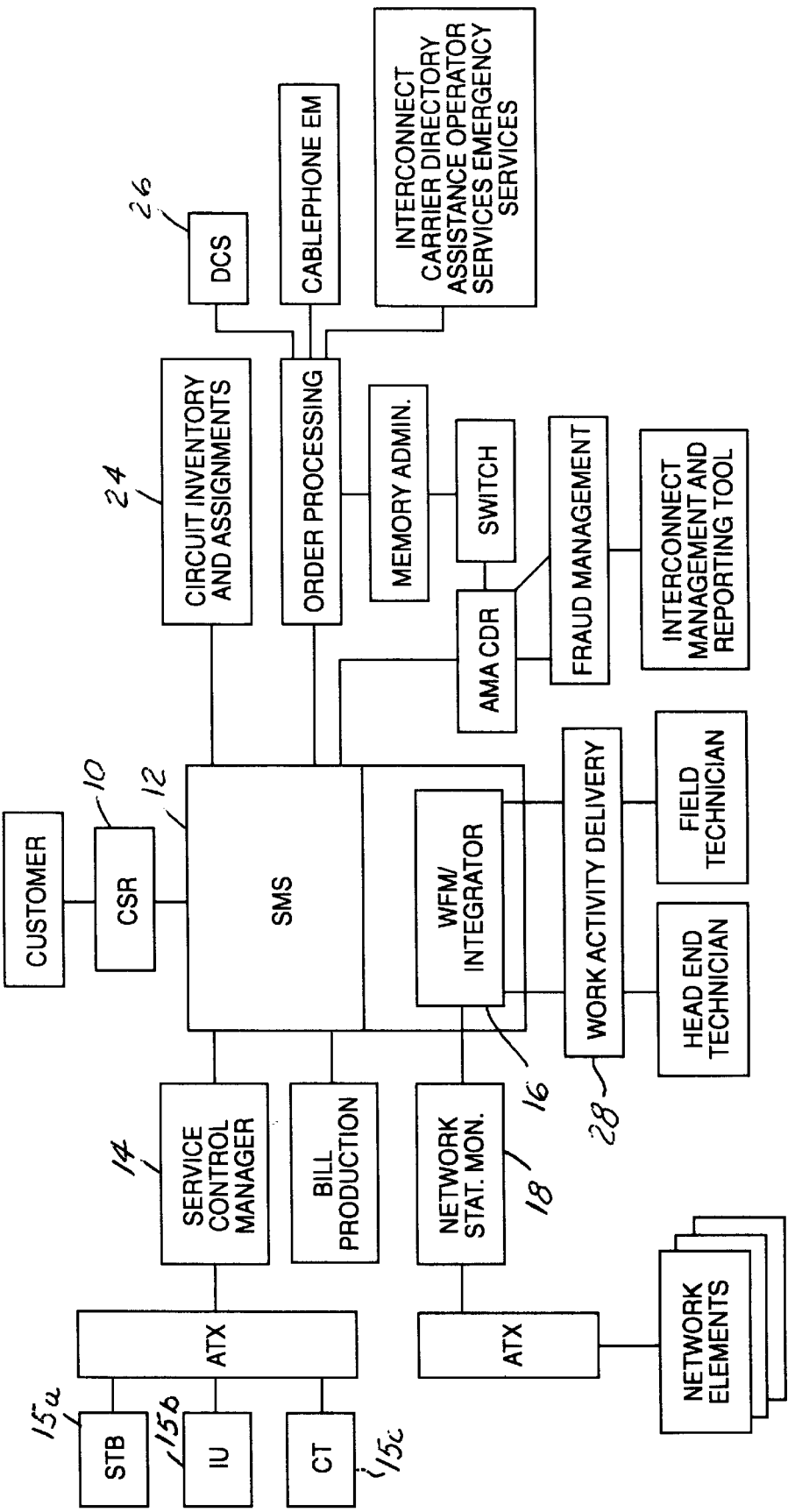
FIG. 2 is a block diagram of a prior art integrated subscriber management system architecture for cable television and telephony services.

The system 40 further includes at least one service application for facilitating delivery and control of the service provided by the service application. Two service applications are displayed in FIG. 3, CATV 50a and Telephony 50b. The service platforms 52a, 52b connected to each of the service applications 50a, 50b, respectively represents the systems and network functionality specific to each service application, as previously shown in FIG. 2. Additional service applications, such as Internet and Personal Communications Service (PCS), could also be included in the system 40, as required. They would be connected to their respective service platforms and perform the necessary service management functions. Each of the service applications 50a, 50b are also connected to WFM 16 so as to provide the necessary work activity.

Because no one vendor has expertise in developing service applications for all services, the system 40 allows for the establishment of an alliance between various vendors and the network provider. This enables the network provider to partner with the "best of breed" vendors for each of the service applications and incorporate their capabilities into the system 40. It is desirable to form an alliance with more than one vendor for each service application so as to provide a competitive environment for delivery of the application. The long term benefits of aligning with multiple vendors include diverse resources and potential improvements in managing the service platforms.

The key component of the system 40 of the present invention is the design and creation of the stand-alone database 56. Although FIG. 3 illustrates a single database, the system 40 may consist of multiple databases integrated into a single database structure. Database 56 can be structured in any manner, such as for example, relational or object-oriented, and includes all the configuration and management data relating to the network, such as the status of each home, the name and address of each customer, billing information, digital address of set top box, etc.

Database 56 is managed by database manager 58. An example of a primary function of database manager 58 includes ensuring that the same data is not updated from multiple sources at the same time. Database manager 58 may also manage the data that is transported to a data warehouse 60 for storage and use by a marketing organization 62 for data gathering and analysis in making marketing decisions. By allowing marketing organization 62 to access the desired data from data warehouse 60 instead of the active database 56, inquiries and report runs will not interfere with service activities supporting the venture.

Database 56 must be flexibly structured so as to ensure that the data required for the variety of services can be maintained and managed to facilitate the introduction of new services and allow changes in service processing.

The application program interface 64 between the service applications 50a, 50b and the Mediation layer 44 is clearly defined in order for the system 40 to function as desired. Thus, interface 64 includes a predefined set of communication rules and protocols that permit two-way exchange of information between the above components. Establishment of interface 64 permits flexibility to add additional service applications 50, and facilitates the replacement of a service application from one vendor with the service application from a different vendor. This provides the "plug and play" capability of a service application that will insure open competition between vendors and functional growth for the ventures. Interface 64 also establishes an environment for competitive pricing from the vendors for improved capabilities and performance.

As shown in FIG. 3, a Rating and Billing Engine 66 is served directly by database 56 and indirectly by database manager 58. Rating and Billing Engine 66 is utilized to generate billing statements 68 for each of the customers. By defining the structure of database 56 and the interface 64 to database 56, billing functions can be initiated and processed with minimum impact to the service application 50a, 50b and subtending service platforms 52a, 52b. The system 40 of the present invention allows for multiple Rating and Billing Engines to be incorporated in the system architecture 40 for unique or specific functions. A Bank Interface 70 may be included for interfacing the system 40 directly with a bank. Bank Interface 70, thus, supports debit of a savings or checking account for payment of CATV or telephony services by the bank.

The architecture of the present invention supports the provisioning and maintenance of multiple services to multiple customers at minimal expense. This architecture, thus, provides an environment for multiple vendor involvement and competition along with the ability to support a scaleable system structure from a start up business to a mature enterprise minimizing the replacement cost associated with up-sizing the system.

While the best modes for carrying out the invention have been described in detail, those familiar with the art to which this invention relates will recognize various alternative designs and embodiments for practicing the invention as defined by the following claims.

What is claimed is:

1. An integrated service management architecture supporting configuration and accounting management functions for multiple telecommunications services including telephony and cable television services, the architecture comprising:

a database for storing configuration and accounting data relating to multiple telecommunications services including telephony and cable television services;

at least one telephony service application independent from the database, the at least one telephony service application provided by a first vendor and having the ability to manipulate configuration and accounting data stored in the database for facilitating delivery of telephony service provided by the at least one telephony service application to a customer of the telephony service application;

at least one cable television service application independent from the database, the at least one cable television service application provided by a second vendor and having the ability to manipulate configuration and accounting data stored in the database for facilitating delivery of cable television service provided by the at least one cable television service application to a customer of the cable television service application; and a predefined application program interface having a set of communication rules and protocols permitting two-way communication of configuration and accounting data between the database and the at least one telephony and cable television service applications and for permitting two-way communication of configuration and accounting data between the database and a future added telecommunications service application provided by a vendor.

2. The architecture as recited in claim 1 further comprising:

a graphical user interface, coupled to the database and the at least one service application, for enabling a user of the architecture to interface with the architecture.

3. The architecture as recited in claim 2 further comprising a mediation application layer coupled between the database and the graphical user interface for providing secured access to the database and system functionality of the architecture by authorized users.

4. The architecture as recited in claim 1 wherein at least one of the telephony and cable television service applications includes a work force management application for providing necessary maintenance to maintain the at least one of the telephony and cable television service applications.

5. The architecture as recited in claim 1 wherein the database includes a database manager for managing the data.

6. The architecture as recited in claim 1 wherein the database supports a data warehouse for storing inactive data and providing decision support activity.

7. The architecture as recited in claim 1 wherein the database includes at least one rating and billing engine for providing billing functions for at least one of the telephony and cable television service applications.

8. The architecture as recited in claim 1 wherein the database includes at least one bank engine for providing direct payment of service from a bank.

* * * * *